Oct. 21, 1969  E. WEICHEL  3,473,679
UNIVERSAL VEHICLE FOR USE AS MULTI-PURPOSE
AGRICULTURAL WORKING MACHINE
Filed Aug. 13, 1965  5 Sheets-Sheet 1
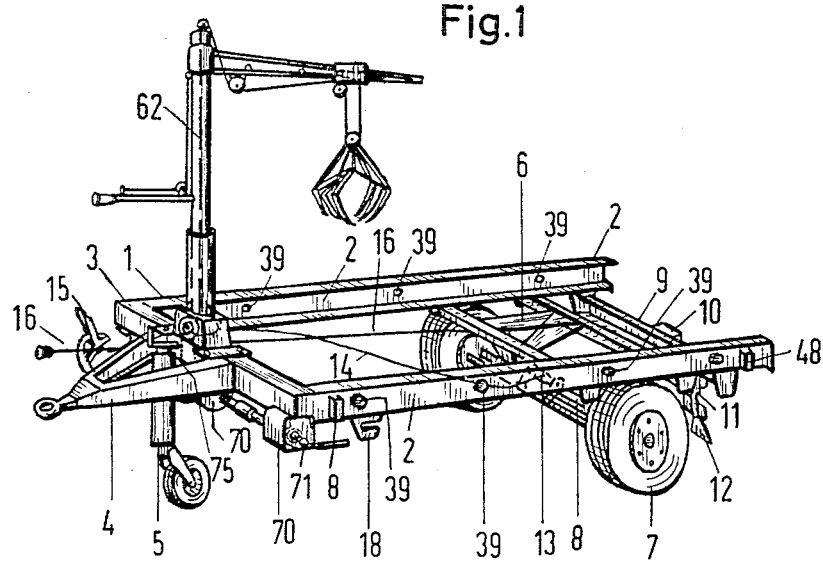
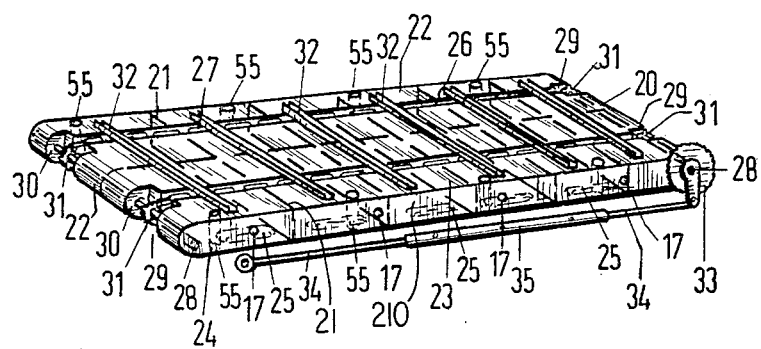
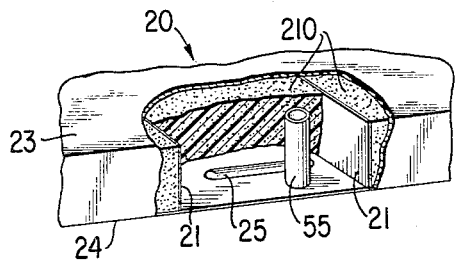
INVENTOR
Ernst Weichel
By Dicke & Craig
ATTORNEYS

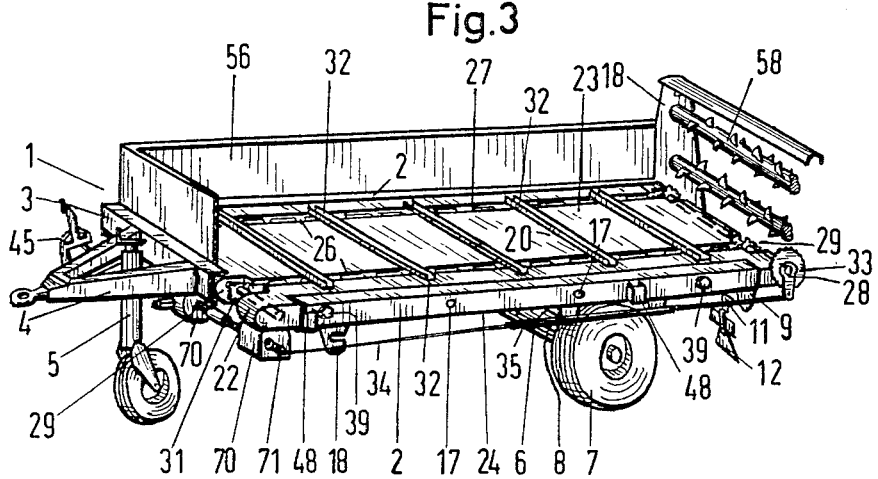
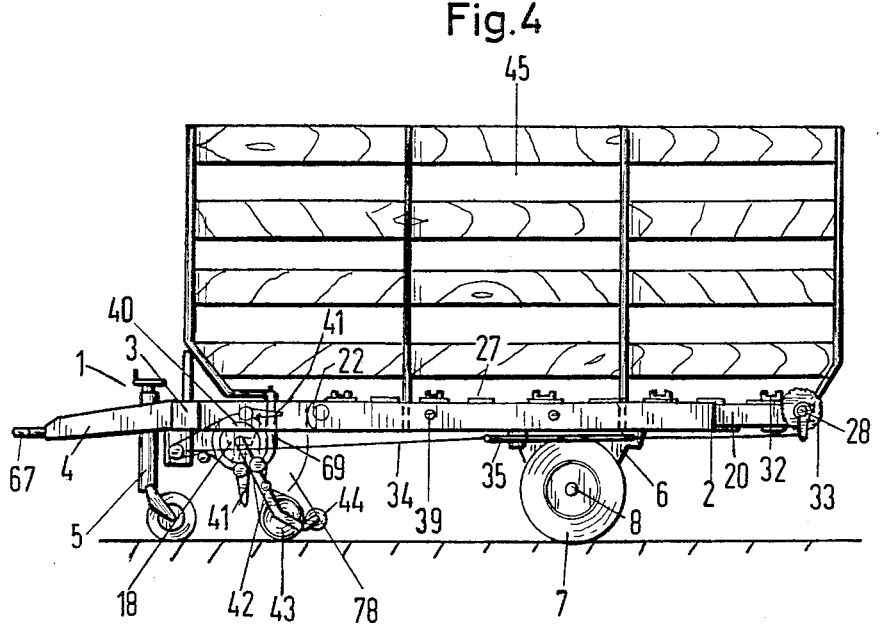

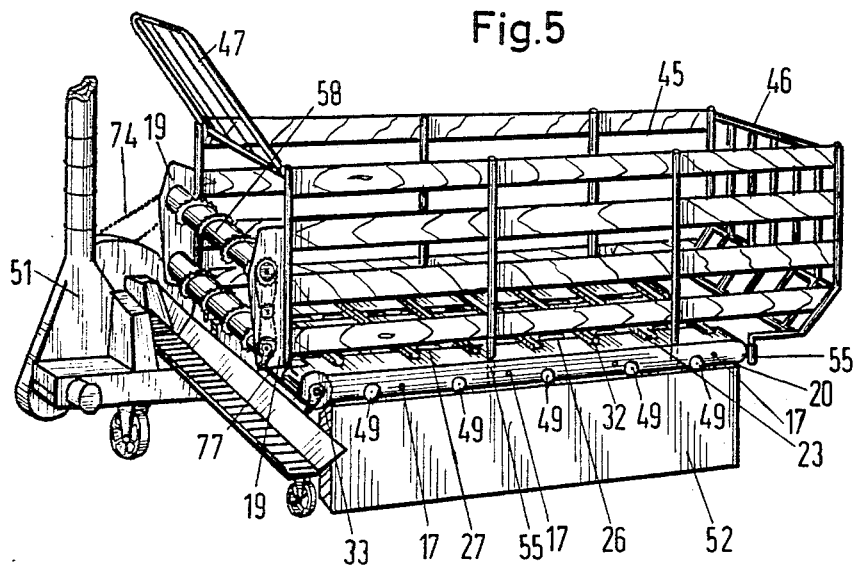
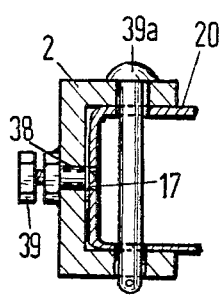
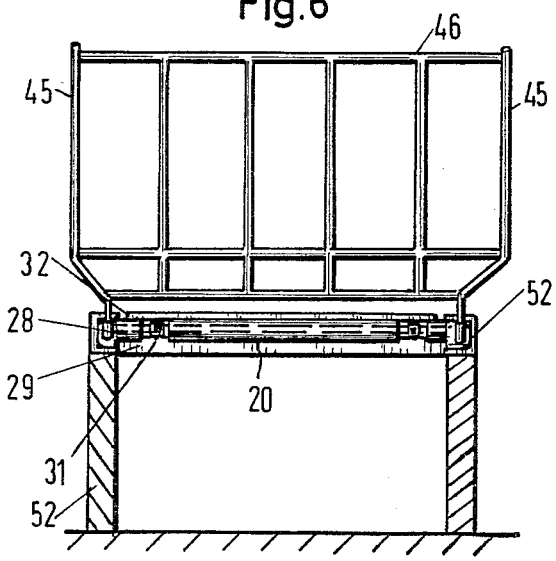
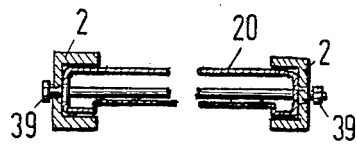

Oct. 21, 1969  E. WEICHEL  3,473,679
UNIVERSAL VEHICLE FOR USE AS MULTI-PURPOSE
AGRICULTURAL WORKING MACHINE
Filed Aug. 13, 1965  5 Sheets-Sheet 4
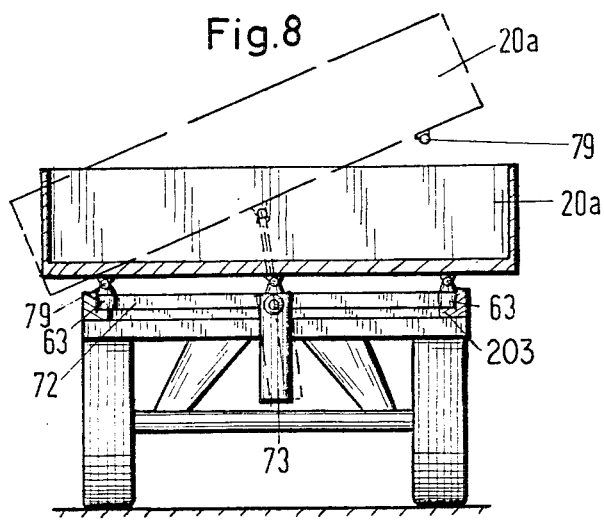
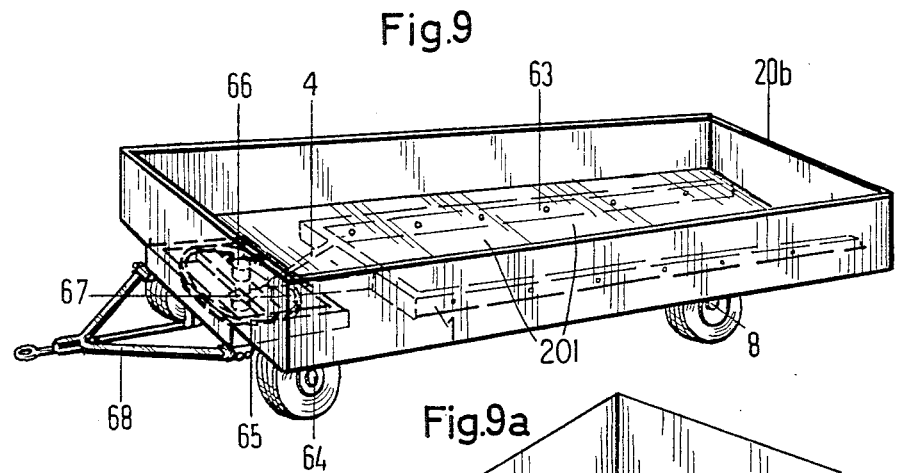
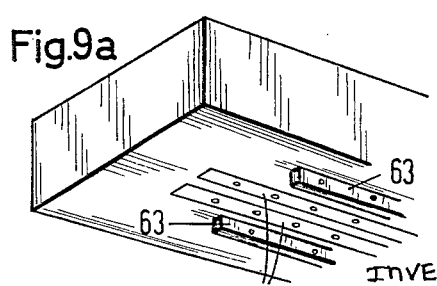
INVENTOR
Ernst Weichel
By Dicke & Craig
ATTORNEYS

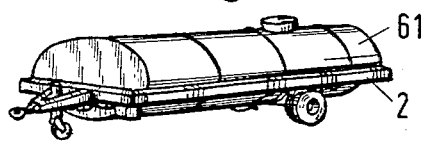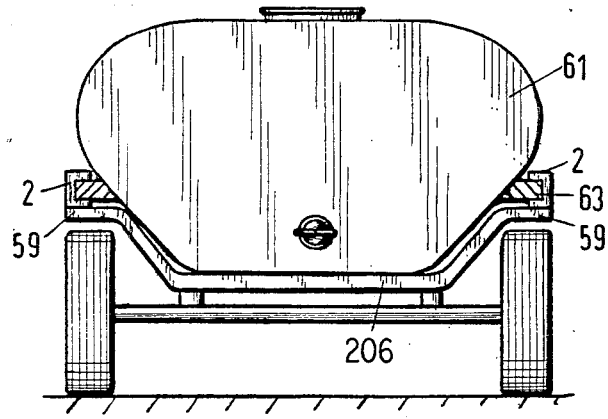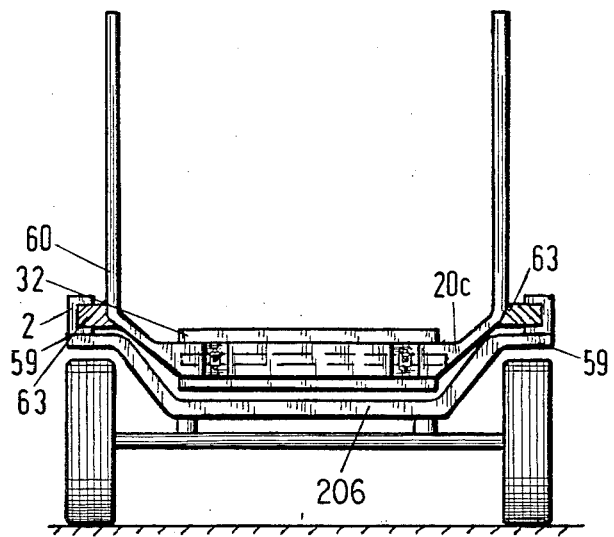

United States Patent Office 3,473,679
Patented Oct. 21, 1969

3,473,679
UNIVERSAL VEHICLE FOR USE AS MULTI-PUR-
POSE AGRICULTURAL WORKING MACHINE
Ernst Weichel, Bahnhofstrasse 1,
Heiningen 7326, Germany
Filed Aug. 13, 1965, Ser. No. 479,466
Int. Cl. B60p 1/64
U.S. Cl. 214—83.24                                27 Claims

ABSTRACT OF THE DISCLOSURE

A universal vehicle for use as a multi-purpose agricultural working machine, adapted to be readily converted to perform different functions, comprising a chassis including a pair of wheels connected by an axle, a frame supported by the axle, the frame including a pair of longitudinal bars in parallel spaced relationship and transverse interconnecting members, and a load platform adapted to be releasably secured to the vehicle frame in a variety of predetermined positions. Additionally, the vehicle chassis is adapted to be utilized in combination with several different implements in a variety of positions.

---

Many types of transportation vehicles are known in agriculture and trade. Single-axle, two-axle and multiple-axle vehicles of the most diverse designs are used, with or without attachments for loading, unloading, spreading or handling loads, e.g., dumpers, manure spreaders, loaders, chaff transportation trucks, special trucks for free-flowing bulk goods, liquid containers, etc. All of these vehicles have the disadvantage that they are specially designed for only one or for few purposes, so that an undertaking usually will require several such vehicles with various types of equipment for the respective individual operations required. The individual constructional elements of the vehicles are thereby hardly or not at all interchangeable, nor can they in most cases be employed in different desired combinations depending on the requirement and purpose.

Thus, for example, it has not been possible to date to convert existing single-axle trailers temporarily into two-axle trailers, or temporarily to convert vehicles for the transportation of heavy loads so that, with the lowest possible deadweight, they can also be used for the transportation of light or voluminous goods. Nor has it been possible to date to use a vehicle of simple construction both with low-lying loading platforms and with the normal loading surface at ramp height. The low-lying loading surface is advantageous when driving on a slope and when transporting heavy livestock or heavy loads, such as heavy machinery. However, it has the disadvantage that the platform either must be undesirably narrow or must be provided with more than one level to accommodate the vehicle wheels, inasmuch as the diameter of the wheels of the truck is usually greater than the height of the platform; on the other hand, if the wheels are arranged laterally alongside a wide loading surface, technical driving difficulties arise due to the exceptionally wide wheel base of the vehicle. Loading surfaces at the usual height, which for the most part lie above the wheels, are, on the other hand, of advantage in the loading and unloading of goods on ramps, for all haulage in sacks or in the case of unloading jobs in connection with conveyors or processing machinery, but are not as advantageous for transporting livestock or heavy machinery, for example.

Single-axle vehicle which, e.g., have a provision at the rear for unloading or for spreading the load, also have the disadvantage that they become "rear-heavy" during the unloading or spreading operation, so that the requisite supplementary loading of the tractor or motive vehicle is partially or wholly eliminated producing a considerable reduction in the traction of the vehicle. This disadvantage has hitherto been the subject of many attempts to improve the design of these vehicles, but most efforts have involved the shifting of the axle of the vehicle to the rear. However, this has resulted in the additional disadvantage that, with the fully loaded vehicle, the so-called "saddle load" which is supported on the tractor is greater than the permissible load-carrying capacity of the engines generally in use.

Other well-known vehicles which, for example, have a roller or scraper type floor and, preferably, a recess in the front part into which is built, e.g., a loading device which can be removed, have the disadvantage that this recess cannot be used as part of the loading surface or loading space without difficulty where the loading appliance is firmly built in, but not in use, or even in the case where such loading device is removed. As is well-known, even if the recess were covered by a plank or a suitably designed box in order to provide an additional space for loading above the loading device, there is still the disadvantage that the roller or scraper type floor which may be present cannot be used for the unloading of the load which lies in this supplementary loading space. By virtue of the prescribed "saddle load" of such trucks having a loading device built in at the front, the axle of these vehicles cannot be placed too far to the rear. Therefore, when the vehicle is half unloaded, an even more undesirable "rear-heaviness" occurs than with the above-mentioned manure spreader without a loading device built in at the front.

A further disadvantage of all known vehicles is the fact that the loading surface cannot as a rule be designed in different lengths, widths, or construction, or only by dispensing with the roller or scraper type floor.

Another disadvantage of most of the known vehicles is that the vehicles with unloading devices in the form of a roller or scraper type floor can only be unloaded relatively slowly and practically *only* towards the rear or the front. Vehicles with an unloading device in the form of a tipping loading surface, on the other hand, are used mainly for unloading towards the side. Unloading towards the rear is also known in the case of the so-called "three-side" dumpers, nevertheless this arrangmeent requires a relatively high construction cost and a very powerfully designed frame, platform, tipper device, etc. Tipping devices towards the rear are not widely in use in agricultural vehicles.

A further disadvantage of almost all known vehicles is that they cannot also be used alternately as a working machine or transportation vehicle, in general, without great difficulties. While attempts have been made to provide such combination possibilities between vehicle and working machine, these attempts have not met with success inasmuch as the conversion of the vehicle into the alternate embodiment, such as a working machine from a transportation vehicle, was much too complicated. Expensive working machines which can be designed as trailers or as self-propelled vehicles, e.g., complete harvesting machines for root crops, combine harvesters, etc., have been provided mainly in the form of special machines, the motor drive of which, as well as the chassis, etc., cannot be used other than in the operational period for such special machines; therefore, to a great extent, these machines represent true seasonal machines.

Attempts have also already been made to so design implements that, as required, they may be removably mounted as extension of the framework of the transportation vehicle, said implements being removed again after use. However, this has the disadvantage that with these conversions all the devices which are necessary for the regular equipment to conform with the traffic laws, such as brakes, lighting, etc., must also be changed each time, so that additional sources of the trouble and undesirable loss of time arise here.

It would be most desirable for agriculture and trade to provide a vehicle having a chassis and axle which is so equipped with all devices prescribed by law such as brakes, lighting, etc., that these do not have to be changed when the vehicle is converted to another use, so that the safety and convenience of the vehicle is constantly assured.

The object of the invention is to provide a vehicle which, to an extent hitherto unknown, is so universally convertible and which can be so complemented by any desired auxiliary equipment that it may be used practically for any reasonable purpose without the chassis frame, axles, brakes, lighting equipment, etc. having to be modified, and without having its suitability for other purposes or use being restricted or excluded by any devices or implements present in the vehicle but not in use, or devices on the vehicle provided for mounting but temporarily removed. Moreover, with this invention a vehicle is provided which, even after it has been acquired, can still be complemented with the most diverse implements in all variations, constantly and without any excessive expense and without rendering existing attachments or equipment valueless.

The solution provided by the invention lies essentially in a loading platform which is designed as an independent assembly separable from the vehicle chassis, possibly of self-supporting construction, which can be set on the vehicle chassis by means of a lifting appliance and/or inserted in the framework of the chassis in the manner of a drawer. It is also contemplated that the platform be removably connected to the chassis not merely in one position but in various different positions and/or which can be exchanged for other types of loading platform, framework, container, working machine or their assemblies.

Inasmuch as according to the invention all individual ancillary implements are so designed that, by maintaining a certain uniformity in the connection dimensions, they can also be purchased subsequently, it is achieved that both the constructional elements of the vehicle chassis as well as all variable complementary devices in themselves can be manufactured economically in large quantities—even by different manufacturers—and therefore sold at relatively low prices. Only in the manner suggested in accordance with the invention can, on the one hand, all assemblies of the chassis and the ancillary implements approach standardization and, on the other hand, all special requirements of the user be so fulfilled by variable equipment that any desired special vehicle or any special working machine can be created from existing standardized assemblies. The repeatedly asked and controversial question whether several special appliances or one multi-purpose appliance should be acquired thereby becomes superfluous inasmuch as in accordance with the invention, every special appliance can be developed into a multi-purpose appliance and every multi-purpose appliance acquired in the first instance can also be subsequently converted into several special appliances. The demarcation between the terms special vehicle or multi-purpose vehicle thereby becomes pointless, just as does that between the terms "vehicle" and "working machine."

These and further objects, features and advantages of the present invention will become more obvious from the following description when taken in connection with the accompaying drawing which shows, for purposes of illustration only, several embodiments in accordance with the present invention and wherein:

FIGURE 1 shows an oblique front view of a single-axle chassis with a rotary crane attachment known per se;

FIGURE 2 shows an oblique front view of a loading platform designed for insertion into the chassis of FIGURE 1;

FIGURE 2a represents a fragmenntary enlarged sectional view of the loading platform shown in FIGURE 2;

FIGURE 3 shows an oblique front view, partially omitting parts of the vehicle according to FIGURE 1, with the loading platform fully inserted and including an additionally mounted spreader attachment;

FIGURE 4 shows a side elevation of the vehicle according to FIGURE 3 in which the spreader is removed and the loading surface is connected to the chassis in a different position, with an additional load enclosure and loading appliance provided;

FIGURE 5 shows an oblique rear view of the loading platform according to FIGURE 4, with a loading space and an additional unloading or dropping appliance in the unloading position, set on trestles or ramps, with a frontal blower or chopper.

FIGURE 6 shows a partial front view of the device of FIGURE 5;

FIGURE 7 shows a detail in section of the removable connection between the framework and the loading platform, by means of thrust bolts or plugs;

FIGURE 7a shows in section a different embodiment of the detail according to FIGURE 7, characterized by through-way bolts;

FIGURE 8 shows a schematic section from the rear of a chassis according to FIGURE 1, with inserted frame and with tipping device;

FIGURE 9 shows a view obliquely from the front of the chassis according to FIGURE 1, with large loading platform and additional front axle for providing a four-wheel vehicle;

FIGURE 9a is a partial view of the large platform in FIGURE 9;

FIGURES 10 and 10a show views of the chassis according to FIGURE 1, with modified axle trestle and inserted or mounted container for liquid or free-flowing bulk goods, and FIGURE 11 shows a view from the rear of the chassis according to FIGURE 1, with modified axle trestle similar to FIGURE 10 and with mounted low-lying loading platform and load enclosure framework.

Looking more particularly to the drawings and especially FIGURE 1, the basic vehicle structure in accordance with one embodiment of the invention includes a chassis 1 which consists preferably of two longitudinal channel bars 2, a front transverse channel member 3 with towing attachment 4, a supporting wheel 5, secured either to the channel member 3 or attachment 4 in the conventional manner, an axle trestle 6, wheels 7 carried by an axle 8 and a rear cross rail 9 secured to the channel bars 2, which rail 9 may carry a coupling device 10 for attachment to other vehicles or equipment. The lighting equipment 11 of conventional form is provided with an electrical supply cable 16 for connection to a power source on the tractor; the warning triangle or reflector 12 can be mounted as a fixed or removable element. The brake actuator mechanism 13, with brake pull cable 14 and brake hand lever 15 can be so designed in a known manner that the brake can be conveniently operated both on the towing device 4 and from the tractor itself. The lighting equipment 11 and the brake equipment 14, 15 are permanently present on the chassis 1, so that these also insure that the vehicle will be traffic-operational when the loading surface is not mounted or inserted.

In accordance with the invention, the frame of the chassis 1 has none of the usual cross bars extending between the longitudinal channel bars 2, along the length thereof, inasmuch as the longitudinal channel bars 2 are interconnected by the channel member 3, axle trestle 6 and cross rail 9 to form a frame. Apart from the front transverse channel member 3, all basic connections between the longitudinal channel bars 2, such as the axle trestle 6 of the rear cross rail 9, are arranged below the channel bars. The space between the two longitudinal channel bars 2, which are preferably made from U-shaped or angle sections, thus remains free, so that either a frame for working machinery or a loading platform 20 (FIGURE 2) can be inserted between the longitudinal channel bars 2 in the manner of a drawer, or can be mounted on or fixedly or detachably connected to the channels 2 in one or more different positions by means of plugs, bolts 39 or similar securing devices.

FIGURE 2 shows the construction of one such loading platform 20 in accordance with the invention corresponding in its dimensions, above all with regard to width, to the chassis 1, and which may be designed according to the invention as a self-supporting, preferably flat hollow body which can be reinforced by ribs 21 inserted between the upper side 23 and the lower side 24 and/or by reinforcing corrugations 25. The individual hollow spaces subdivided in this hollow body by the ribs 21 can be filled in with a suitable filler 210, which must be as light as possible to keep the overall weight of the platform low, and which contributes toward increasing the rigidity of the loading platform and toward a reduction of possible noise when driving. Such a filler may, for example, include a polyurethane foam or other plastic material.

The loading platform 20 may be provided with guide grooves 26 pressed into its upper side 23 to accommodate scraper chains 27; or, if such scraper chains are not provided, the platform may have a completely level surface. In many cases, however, drag chains 27 are necessary or advisable, in which case the loading platform 20 is provided at its front and/or rear ends with preformed bearing surfaces 30 for the driving and reversing shafts 28 and recesses 29 for the chain guide wheels 31 of the scraper chains 27.

Likewise, the loading platform 20 may be provided with fixing attachments 55 for driving or working devices of a design known per se which may be selectively connected to the loading platform. The scraper chains 27 are driven in a step-like manner by means of a known ratchet-type wheel 33, which is actuated by a push or pull road combination 34, 35. According to the invention, the push or pull rod combination is withdrawable, and can be locked in various lengths to regulate the extent of rotation of the wheel 33 for each reciprocal movement of the rod such that the scraper chains 27 can be engaged or disengaged in a known manner and their speed regulated as desired. For the drive of the scraper chains 27, of course, other known devices can also be used, e.g., gears, articulated shafts or overrunning clutches, etc. Preferably, the driving shaft 28 for the scraper chain 27 is arranged to be movable and fixable in the loading platform 20 in a manner known per se with the guide wheels 31 running loosely on it so that the scraper chain can be re-tensioned. The length of the scraper slats 32 fastened in known manner on the scraper chains 27 is preferably shorter than the clearance between the longitudinal channel bars 2 and/or the width of the loading platform 20.

According to the invention, the loading platform 20, as shown in FIGURES 3 and 7a, is inserted in the manner of a drawer between the longitudinal channel bars 2 of the chassis 1 and e.g., connected to the longitudinal channel bars 2 by means of bolts 39 or plugs 39a (FIGURE 7). The intervals between the bolts 39 or the plugs 39a determine the position of corresponding apertures both in the loading platform 20 and in the longitudinal channel bars 2, and also with the intervals between the various desired positions of the loading platform so that they match each other in any desired position.

The push or pull rod combination 34, 35 for the ratchet-type wheel 33, after the insertion of the loading platform 20, is connected by means of a known removable snap-locking device (not shown) to a crank gear 71 which is connected to a gear system 70 carried on the main chassis. The gear system 70 can be driven in a manner known per se both by an articulated shaft from the tractor or by means of a separate engine or electric motor mounted on the chassis for transmitting the power in known manner via an articulated shaft, chain drive, V-belt, etc.

In a manner known per se devices for the insertion or articulation of end walls, side walls 56 (FIGURE 3) or superstructures 45, 46, 47 (FIGURES 4, 5 and 6) known per se for a loading space which can also be designed as rapid locking devices known per se, can be mounted on the chassis 1 or the channel bars 2 as well as on the loading platform 20. Likewise, receiving devices, brackets, or the like 18 or 19 known per se can also be provided both on the loading platform 20 and on the chassis 1 for the insertion or mounting of any desired working implements 40, 58, transportation containers 61, etc. Such known devices are represented in FIGURES 1, 2, 3, 5, 7 and 7a as boreholes or securing apertures 17, holding brackets 18 or 19, insertion pockets 48 and/or tapholes 38, bolts 39 and plug sockets 55.

In the position of the axle 8 on the chassis 1 is so selected that the distance between the axle 8 and the rear end of the longitudinal channel bars 2 is small and a short loading platform 20 is utilized, above all when the loading platform 20 is pushed entirely between the longitudinal channel bars 2, there results a high degree of nose-heaviness of the vehicle and only a slight relief is provided even by a working implement 58 mounted at the rear thereof. Under these conditions and particularly in the case of a load spread primarily to the rear of the platform, the removal of load to the rear by the traction floor is slight and in no case does any stern-heaviness of the vehicle occur due to the position of the axle. If it is required, for technical driving reasons, to shift the center of gravity of the vehicle more toward the vicinity of the axle 8, e.g., when a loading appliance 40, 43 is to be mounted at the front, then this can be effected in a very simple manner by pushing the loading platform 20 toward the rear; or, as is usually more desirable, the platform 20 may be replaced by a similar one of greater length. At all times, therefore, a vehicle can be provided having a center of gravity which lies directly above the axle.

Naturally, the various designs of the loading platform 20 can differ from each other not only in their dimensions but also in the method of construction of the floor 23 and/or the scraper chains 27. Loading platforms 20 with scraper chains 27 and scraper slats 32 can also be used in exchange for other loading platforms without scraper slats 32 and without guide grooves 26 for the chains 27. This, e.g., is advantageous when delicate products are transported in sacks or when the truck is to be loaded or unloaded by means of wheel barrows.

As seen in FIGURE 8, a loading platform 20a, e.g., of sheet metal, can be provided additionally with a tilting devcie 73 of mechanical or pneumatic nature, for example, mounted on support 72, and can be used for the transportation of gravel, sand, etc. Instead of the scraper chains 27, which usually are provided at substantial intervals with scraper slats 32, conveyor floors known per se can also be used for such purposes, which floors consist usually of an endless belt or of slats laid closely together on a belt or on chains (not shown).

The interchangeability of the various loading platforms 20 has the advantage that, for example, inconvenient cleaning work is dispensed with when the same truck is to be used both as manure spreader and for the loading of green forage. This double use has hitherto been objected to owing to the well-known danger of corrosion and also for reasons of hygiene. Such danger is eliminated in accordance with the invention by simply changing the loading platform before a change in operations.

The length of the interchangeable loading platforms 20 can, of course, also be so dimensioned such that the loading platform still projects to a certain extent beyond the rear of the longitudinal channel bars 2 even when it is fully pushed into the longitudinal channel bars 2. Any desired requirement can therefore be fulfilled with regard to the position of the center of gravity and the capacity of the vehicle; furthermore, the same advantages are achieved as when the axle was designed adjustable relative to chassis 1.

If the chassis 1, as presented in FIGURE 4, is to be provided at its front with, e.g., a known charging device 40, 41, 42, 43, 44 or a different working implement such as 51 in FIGURE 5 arranged at the front of the vehicle, then the loading platform 20 is not pushed so far in or over the longitudinal channel bars that it approximately contacts the cross connection 3, but only so far that between the cross connection 3, the longitudinal channel bars 2 and the front edge 22 of the loading platform 20 in the chassis 1 a clearance 69 is defined in which the known charging device 40–44 along with a conveyor channel 78 extending to about the height of the loading platform can be inserted with the aid of suitable holding brackets 18 secured in a removable manner on the longitudinal channel bars 2. The detachable fixation of the loading platform 20 in this position is, as already mentioned, possible since the spacing between the individual securing apertures 17 and the bolts 39 on the platform and chassis, respectively, correspond. Thus, a securing of the relatively shifted parts may be easily accomplished. With this equipment of the vehicle, a vehicle with larger loading space is automatically provided inasmuch as the loading platform 20 projects farther to the rear and because the loading space can be extended above the area occupied by the clearance 69 and the charging device 40.

If this vehicle is used for the transport of other goods, e.g., in winter when the charging device 40 is completely dismantled, then the loading platform 20 is again pushed fully forward after the removal of the charging device 40–44 and connected again fixedly but detachably in this position with the channel bars at several points 17 and 39. A completely normal transportation vehicle is thereby providing that, in respect of its dimensions, its dead weight and the axle arrangement, differs not in the slightest from other vehicles which do not have the possibility to temporarily mount a working or charging device.

The pushing back or forth, or the insertion and removal of the loading platform 20 into and out of the vehicle chassis 1 can be effected by hand in the manner of a drawer or by means of known auxiliary aids of a mechanical nature, such as spindles, lifting elements, etc. The scraper chains 27 can also be driven mechanically, such as by hand crank, and temporarily hooked to the chassis 1 so that the loading surface can be thereby pulled onto the chassis until it is in the desired position where it is then detachably connected to the longitudinal channel bars 2.

The rear ends of the longitudinal channel bars 2 are advantageously somewhat expanded like a mouth in order to simplify the insertion and removal of the exchangeable loading platforms. The sliding of the loading platform 20 when pushing into the longitudinal channel bars 2 can be further facilitated in that the longitudinal channel bars 2 and/or the loading platform 20 have devices known per se for the reduction of the friction, e.g. rollers or sliding surfaces 49 (FIGURE 5). If it is intended to insert the loading platform 20 into the frame by mechanical power, in particular when it has been loaded with goods, then generally known threaded spindles, cable winches, lifting cylinders, toothed racks, etc.—not shown in the drawing—can be used with adjustable speed driven by the gear system 70 or by auxiliary motors 54. This movement of the loading platform in the chassis can, according to the invention, even be effected while driving, so that the driver may shift the distance of the center of gravity of the vehicle from the axle 8 and thereby adapt it to all the requirements of the working implements, the terrain or the traction conditions.

In this case, naturally, safety measures will be installed in the longitudinal channel bars 2 which make it possible at all times to brake the loading platform within the frame, or stops must be provided which permit the shifting to take place only within a desired and previously determined range.

A particularly advantageous embodiment of the invention is possible, as represented in FIGURES 3, 5 and 6, in which the loading surface 20 itself is provided with side walls 56 (FIGURE 3), or load enclosures 45, 46, 47 (FIGURES 5 and 6) secured thereto so that a large container with or without scraper chains 27 is formed; the contents of the vehicle can either be unloaded from the vehicle by any suitable means, such as the scraper floor, or the container, including the platform 20 and the side walls 45, 46, and 47 can be set down with its entire contents—preferably on a ramp or a stand 52—separate from the chassis 1 and subsequently returned to the chassis 1 either after the removal of the contents or with its contents still loaded. It is thereby possible to use several loading platforms 20 or large containers in conjunction with a common chassis 1 having a charging device 40–44, such as illustrated in FIGURE 4, so that all the advantages of easily interchangeable equipment are attainable and the charging mechanism 40–44 may also be built into the truck or chassis to facilitate the operation. The loading platform 20 removed from the vehicle can, without any difficulty, be unloaded onto a ramp 52 for stationary storage or also may be made mobile to a limited extent on auxiliary rollers 40, so that it can be used as desired as a storage container, dosing container or as an intermediate storage for any desired load which must be quickly unloaded from the main vehicle 1 and subsequently further processed. The storage container can, for example, also be set down on a meadow, etc., or in a free-range stable, etc. and, when it is filled with fodder, serve as an automatic feed hopper for the feeding of all animals.

In accordance with the invention, it can then also be emptied mechanically without difficulty when it is not inserted in the chassis, such as by means of a hand crank mounted in wheel 33, which chassis for example can be employed in the meantime for some other purpose.

The scraper chains 27 and the step wheel 33 can, e.g., be driven in a manner known per se by means of a mountable electric gear motor (not shown in the drawing) or the drive can be taken, as seen in FIGURE 5, from a reduction or dosing appliance 58 via a crank rod 77, which for its part is driven by chain or belt 74 or articulated shaft from a hoisting engine or a blower or chopper 51.

FIGURE 8 shows a modified embodiment in which the level of the loading surface does not lie at the height of the upper edge of the longitudinal side bars 203 of the chassis 1. Rather, the loading surface is arranged higher than the longitudinal side bars 203 because it is provided with guide rails 63 on its lower side which match the longitudinal side bars 203 of the chassis. It is thereby possible to design the loading platform 20a also wider than the chassis 1, if required.

The embodiment of FIGURE 8 serves at the same time to provide a vehicle with mountable and tiltable loading platform 20a. The guide rails 63 are connected to a frame 72 and inserted in the L-shaped longitudinal side bars 203. The rails 63 may also carry a tilting platform 20a hinged on hinges 79 which can be tipped to either side. The tilting device can consist of one or more lifting cylinders 73, which may be mechanical or penumatic or similar devices, which are fixed as a special constructional unit on the axle trestle 6 of the chassis 1 or directly on the tilting frame 72. The drive of the tilting device 73 can be effected in a manner known per se by means of a hand winch, hand powered hydraulic lifting mechanism or also by means of a power-operated hydraulic lifting mechanism, or mechanically.

FIGURE 9 shows a further modified embodiment in which the single axle chassis 1 is temporarily connected with a second single-axle truck to provide a two-axle truck. Not only can substantailly longer loading platforms 20b thereby be used, but greater useful loads can also be transported inasmuch as the load-carrying capacity of the vehicle can be increased through the larger number of wheels. The longer loading platform 20b is connected to the chassis 1 by means of guide rails 63 which are shorter than the loading platform. The loading platform 20b may consist of plates 201, as shown in FIGURE 9, connected by reinforcing struts or supports 202 (FIGURE 9a). Preferably, the loading platform 20b overlies with its undersurface the upper surface of the chassis 1 so that it projects beyond the pole hook of the chassis. A front axle 64 with a rotary mounting 65 receives the bugle 67 of the chassis by means of a center pin 66 such that the rotary mounting 65 is rigidly connected to the towing attachment 4 by means of stops or other connections known per se. A towing bracket 68 is hinged to the front axle 64 or to the rotary mounting 65 and may be provided with a built-in brake acting on the front axle. With this embodiment, however, it is necessary to remove the braking device 14, 15 of the axle 8 of the chassis 1 which forms here the rear axle of a four-wheeled vehicle, and to replace or supplement it by a longer one, so that the braking for both axles may be actuated together. Such braking devices are generally known, so that any detailed description can be omitted. A known axle with so-called axle-pivot steering can also be used instead of the rotary mounting 65.

FIGURES 10, 10a and 11 show another modified embodiment of the invention in which the axle trestle 206 at its supporting points 59 carrying the longitudinal channel bars 2 is notably higher than the portion thereof forming the center of the trestle. A loading platform 20c of trough-like design providing a loading container 60, or also a container for liquids 61, can therefore be accommodated by the chassis 1 so that the center of gravity of the vehicle lies very low in an extremely favorable manner.

If perishable goods, e.g., fruit, root crops, grain, etc., which are mainly packed in boxes, baskets, sacks, packets, pallets, barrels, etc., shall be transported then loading often creates difficulties. For this reason it is proposed— as shown in FIGURE 1—to provide the vehicle additionally with a hydraulic or mechanically operated hoist or rotary crane 62 known per se which is able to set loads on or remove loads from the loading surface with little difficulty.

As soon as a number of such pallets, boxes or individual loads have been filled on the loading surface the scraper type drag floor is allowed to run a certain extent to the rear so that the crane can load the space more fully. In this manner, through the joint action of the crane 62 with the scraper type drag floor, the mechanical loading and unloading of the entire loading surface is possible even when the crane is very simply constructed and has only a small limited working range.

Moreover, it also lies within the scope of the present invention that the various insertable loading platforms 20 can be combined with any required working implements 58, which are attached, fixed or removable on the chassis 1 or on the loading platform 20. The loading surface can therefore also serve simultaneously both as storage container for the load and as frame or base or connecting unit for the individual elements of one or more working implements 58. Such exchangeable working machines or implements 58 to be connected to the vehicle include, e.g., equipment known per se for the reduction, sorting, dosing, unloading, threshing, etc., as well as so-called complete combine harvesters, root crop harvesting machines, etc. As a particular advantage in this respect, it must be recognized that the mounting and dismounting of all working machinery can be done very quickly because they are all mounted on a loading surface 20 or a base frame corresponding to the latter which matches the chassis and which can be attached or removed very quickly. After mounting, merely the gear system 70 provided on the chassis must be connected to the driving elements of the working machines by means of belts, chains or articulated shafts known per se.

The individual assemblies, such as chassis 1, lading platform 20, working machinery 58, to be united on the unit construction, can of course be made by different manufacturers, and therefore with conformity in the main constructional dimensions can be mass produced very rationally and inexpensively and/or exchanged between the individual undertaking or the manufacturers or users. The acquirement of any desired set of vehicle frames 1 and loading platforms 20 for the different purposes of application and working implements 58 for the handling of the load is possible in any desired sequence, as well as any required subsequent complementation. Unwise investments in equipment are practically impossible inasmuch as an undertaking can in the first instance include, for example, a chassis 1 with a loading device 40–44 and a spreader 58, and then subsequently, when means permit, an addition may be made in the form of a second truck which may then be used exclusively with the spreader 58, used previously only on the initial chassis. The security of sales for the individual manufacturers and thereby the planning of production on a long term basis is provided with this arrangement since the system once introduced need no longer be changed, because by subsequent purchase either of chassis 1 or working implements it can be continually supplemented and maintained at the latest state of technology.

By agreement on the main dimensions between the various manufacturers the urgently needed investments of industry can be financed inexpensively, the maintenance of space parts stores reduced in cost and the rationalization of the undertakings considerably promoted. Naturally, the inventive idea described in the foregoing can without any trouble also be applied to selfpropelled vehicles or building machines, e.g., haulage trucks, transportation vehicles, etc.

While I have shown and described several embodiments in accordance with the present invention, it is understood that the same is not limited thereto but is susceptible of numerous changes and modifications within the spirit and scope thereof as known to a person skilled in the art; and L, therefore, do not wish to be limited to the details shown and described herein but intend to cover all such changes and modifications as are encompassed by the scope of the appended claims.

I claim:

1. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasably secured in position to said side channels so as to permit selective relative sliding adjustment therebetween, said load platform means being positioned in said frame means in spaced relationship with said transverse channel so as to define an opening with said channels and said transverse channel, and at least one loading device removably secured in said opening.

2. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasably secured in position to said side channels so as to permit selective relative sliding adjustment therebetween, said load platform means being positioned in said frame means in spaced relationship with said transverse channel so as to define an opening with said side channels and said transverse channel and loading means removably secured in said opening, said load platform means being movable by shifting within said side channels, upon removal of said loading means, into contact with said transverse channel, the overall length of said vehicle being thereby reduced by the length of said opening.

3. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasably secured in position to said side channels so as to permit selective relative sliding adjustment therebetween, said load platform means including conveyor-type means extending longitudinally thereof for conveying material along the length of said load platform means, said load platform means comprising a substantially closed self-supporting shell providing an essentially flat load surface of rigid construction and light weight, said self-supporting shell being provided with longitudinal grooves, said conveyor-type means being accommodated within said grooves.

4. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasably secured in position to said side channels so as to permit selective relative sliding adjustment therebetween, said load platform means including conveyor-type means extending longitudinally thereof for conveying material along the length of said load platform means, said load platform means comprising a substantially closed self-supporting shell providing an essentially flat load surface of rigid construction and light weight, said conveyor-type means including a plurality of chains each extending in a closed loop around the length of said load platform means and scraper slat means extending transversely to said chains and secured thereto, said self-supporting shell being provided with recesses at the extreme ends thereof accommodating a plurality of driving wheels for said chains mounted on a pair of drive shafts, said drive shafts being supported by said shell.

5. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasable secured in position to said side channels so as to permit selective relative sliding adjustment therebetween, said load platform means including conveyor-type means extending longitudinally thereof for conveying material along the length of said load platform means, said load platform means comprising a substantially closed self-supporting shell providing an essentially flat load surface of rigid construction and light weight, said closed hollow body being provided with longitudinal grooves, said conveyor-type means being accommodated within said grooves, said conveyor-type means including a plurality of chains each extending in a closed loop around the length of said load platform means and scraper slat means extending transversely to said chains and secured thereto, said self-supporting shell being provided with recesses at the extreme ends thereof accommodating a plurality of driving wheels for said chains mounted on a pair of drive shafts, said drive shafts being supported by said shell.

6. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasably secured in position to said side channels so as to permit selective relative sliding adjustment therebetween, said load platform means including conveyor-type means extending longitudinally thereof for conveying material along the length of said load platform means, said load platform means comprising a substantially closed self-supporting shell providing an essentially flat load surface of rigid construction and light weight, said conveyor-type means including a plurality of chains each extending in a closed loop around the length of said load platform means and scraper slat means extending transversely to said chains and secured thereto, said self-supporting shell being provided with recesses at the extreme ends thereof accommodating a plurality of driving wheels for said chains mounted on a pair of drive shafts, said drive shafts being supported by said shell, at least one of said drive shafts being connected to a ratchet-type drive means for driving said driving wheels, 7. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasably secured in position to said side channels so as to permit selective relative sliding adjustment therebetween, said load platform means including conveyor-type means extending longitudinally thereof for conveying material along the length of said load platform means, said load platform means comprising a substantially closed self-supporting shell providing an essentially flat load surface of rigid construction and light weight, said conveyor-type means including a plurality of chains each extending in a closed loop around the length of said load platform means and scraper slat means extending transversely to said chains and secured thereto, said self-supporting shell being provided with recesses at the extreme ends thereof, accommodating a plurality of driving wheels for said chains mounted on a pair of drive shafts, said drive shafts being supported by said shell, at least one of said drive shafts being connected to a ratchet-type drive means for driving said driving wheels, said ratchet-type drive means including a step wheel rigidly connected to one said drive shaft, a reciprocating push rod in ratchet-type engagement with said step wheel, and a crank assembly mounted on said vehicle chassis means and removably connected to the free end of said push rod for effecting reciprocation thereof, said push rod being adjustable as to length so as to provide regulation of the drive of said chains.

8. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasably secured in position to said side channels so as to permit selective relative sliding adjustment therebetween, said load platform means including conveyor-type means extending longitudinally thereof for conveying material along the length of said load platform means, said load platform means comprising a substantially closed self-supporting shell providing an essentially flat load surface of rigid construction and light weight, said conveyor-type means including a plurality of chains each extending in a closed loop around the length of said load platform means and scraper slat means extending transversely to said chains and secured thereto, said self-supporting shell being provided with recesses at the extreme ends thereof accommodating a plurality of driving wheels for said chains mounted on a pair of drive shafts, said drive shafts being supported by said shell, said scraper slat means being of shorter length than the width of said load platform means.

9. A multi-purpose agricultural vehicle capable of simple conversion to perform a multitude of operations comprising:

vehicle chassis means including at least a pair of wheels interconnected by axle trestle means and frame means supported upon said axle trestle means, said frame means consisting at least of a pair of longitudinal side channels in parallel spaced relationship and an interconnecting transverse channel extending between said side channels at one end thereof, and load platform means slidingly interengaged with said side channels in the manner of a drawer and releasably secured in position to said side channels so as to permit selective relative sliding adjustment therebetween, said load platform means including conveyor-type means extending longitudinally thereof for conveying material along the length of said load platform means, said load platform means comprising a substantially closed self-supporting shell providing an essentially flat load surface of rigid construction and light weight, said conveyor-type means including a plurality of chains each extending in a closed loop around the length of said load platform means and scraper slat means extending transversely to said chains and secured thereto, said self-supporting shell being provided with recesses at the extreme ends thereof accommodating a plurality of driving wheels for said chains mounted on a pair of drive shafts, said drive shafts being supported by said shell, at least one of said drive shafts being connected to a ratchet-type drive means for driving said driving wheels, said ratchet-type drive means being driven by a self-driving auxiliary attachment connected to said load platform means.

10. A multi-purpose agricultural vehicle capable of simple conversion to perform a multitude of operations comprising:

vehicle chassis means including at least a pair of wheels carried by axle trestle means and frame means supported on said axle trestle means, said frame means consisting at least of a pair of longitudinal side bars in parallel spaced relationship and an interconnecting transverse bar at one end thereof, and at least one load platform means releasably securable to said side bars in at least two different operative positions, said load platform means being positioned in said frame means in spaced relatoinship with said transverse bar so as to define an opening with said longitudinal side bars and said transverse bar and loading means removably secured in said opening.

11. A multi-purpose agricultural vehicle according to claim 10, said vehicle chassis means and said load platform means being provided with corresponding securing and attaching means for removably securing auxiliary equipment to said vehicle.

12. A multi-purpose agricultural vehicle according to claim 10, said vehicle chassis means being provided with vehicle braking means and vehicle lighting and warning means to the exclusion of said load platform means so that said vehicle chassis means may be legally utilized without said load platform means.

13. A multi-purpose agricultural vehicle according to claim 10, said vehicle chassis means and said load platform means being provided with corresponding securing and attaching means for removably securing auxiliary equipment to said vehicle, and further comprising side wall means removably mounted on said load platform means for providing an enclosed loading and transporting space.

14. A multi-purpose agricultural vehicle according to claim 10, wherein:
said load platform means is wider than said vehicle chassis means and includes guide rail means for supporting said load platform means above said vehicle chassis means, said guide rail means being slidingly interengaged with said side channels.

15. A multi-purpose agricultural vehicle according to claim 13,
said axle trestle means for supporting said frame frame means on said axle means having upper lateral portions connected to said side bars and a lower central portion connected to said axle means,
said load platform means having upper lateral portions and a lower central portion.

16. A multi-purpose agricultural vehicle according to claim 10, wherein:
said side channels are generally U-shaped in cross section and dimensioned to correspond to the thickness of said load platform means.

17. A multi-purpose agricultural vehicle according to claim 16, wherein:
the ends of said side channels, opposite said transverse channel have a more opened cross section to more easily receive said load platform means.

18. A multi-purpose agricultural vehicle according to claim 10, wherein:
said side bars are generally L-shaped in cross section, and further comprising guide rail means fixed to the underside of said load platform means and supported within said side bars.

19. A vehicle according to claim 10, wherein said load platform means is provided with roller means for facilitating the sliding engagement of said load platform means in said longitudinal side bars.

20. A vehicle according to claim 19, wherein said load platform means is additionally provided with stop means for limiting the extent of sliding movement of said platform means in said longitudinal side bars.

21. A vehicle according to claim 10, wherein said load platform means and said vehicle chassis means are provided with securing apertures along the sides thereof and spaced at equal intervals, and securing means extending the entire width of said chassis means through said apertures for releasably securing said load platform means to said vehicle chassis means.

22. A multi-purpose agricultural vehicle according to claim 10, further comprising means for slidingly adjusting the relative puosition of said load platform means while the vehicle is in motion.

23. A multi-purpose agricultural vehicle according to claim 10, wherein said load platform means further comprises a substantially closed self-supporting shell providing an essentially float load surface of rigid construction and light weight.

24. A multi-purpose agricultural vehicle according to claim 23, wherein said self-supporting shell is filled with a filler material of low specific weight and high structural rigidity.

25. A multi-purpose agricultural vehicle according to claim 24, wherein said self-supporting shell further includes reinforcing corrugations.

26. A multi-purpose agricultural vehicle according to claim 1, further comprising a second pair of wheels and a second axle means, and pivotable coupling means releasably connecting said second axle means with said transverse channel of said vehicle chassis means.

27. A multi-purpose agricultural vehicle according to claim 1, wherein said load platform means is tiltable about a longitudinal axis of said vehicle, and further comprising pneumatic means secured to said frame means for effecting tilting of said load platform means.

References Cited
UNITED STATES PATENTS

| | | | |
|---|---|---|---|
| 1,081,697 | 12/1913 | Renney et al. | 214—83.36 |
| 2,988,241 | 6/1961 | Morrison | 296—39 XR |
| 3,084,816 | 4/1963 | Bozio | 214—83.24 |
| 1,270,086 | 6/1918 | Wochner. | |
| 2,875,839 | 3/1959 | Spinks | 214—515 |

ALBERT J. MAKAY, Primary Examiner

U.S. Cl. X.R.

214—83.26, 515, 519